Patented Nov. 8, 1932

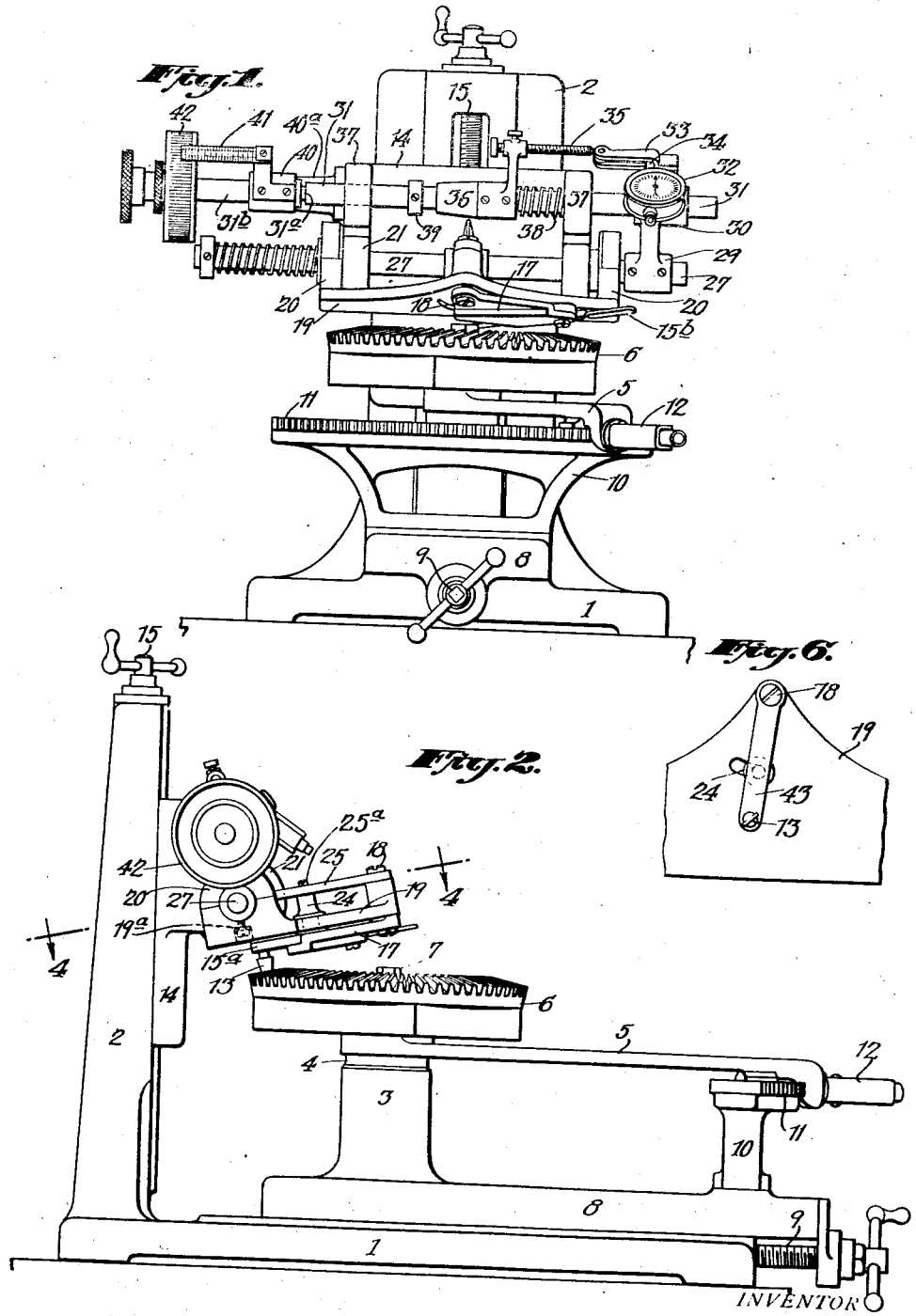

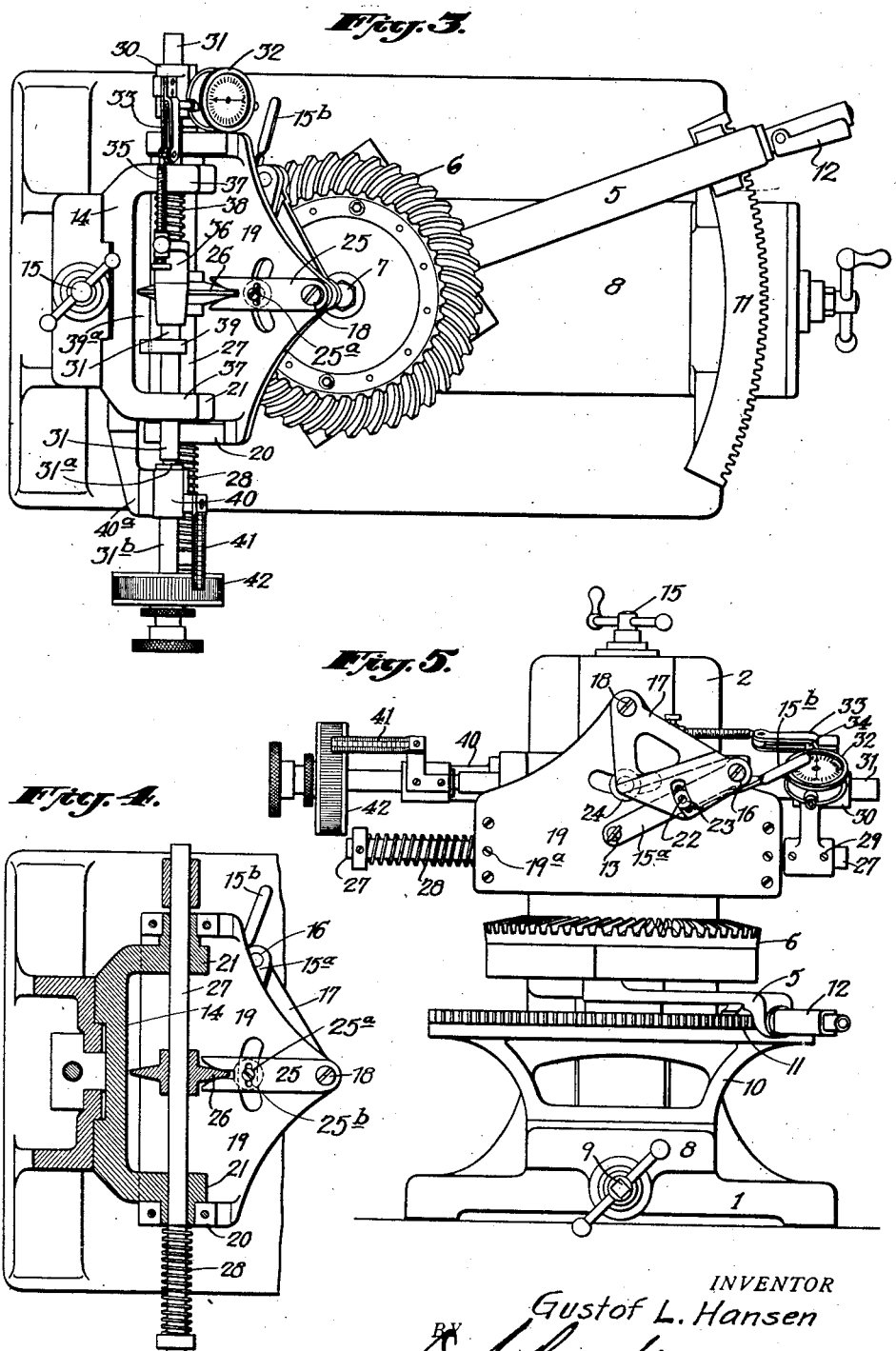

1,886,543

UNITED STATES PATENT OFFICE

GUSTOF L. HANSEN, OF DETROIT, MICHIGAN, ASSIGNOR TO THE GEAR GRINDING MACHINE COMPANY, OF DETROIT, MICHIGAN

APPARATUS FOR TESTING GEAR TEETH

Application filed February 17, 1928. Serial No. 254,924.

The object of the invention is to test the accuracy of the contour of the teeth of gears, particularly bevel gears and gears having spiral or similarly curved teeth.

The accompanying drawings illustrate embodiments of the invention.

Figs. 1, 2 and 3 are respectively a front and side elevation and a plan of a machine for testing a common form of spiral bevel gears;

Fig. 4 is a sectional view approximately on the line 4—4 of Fig. 2;

Fig. 5 is a view similar to Fig. 1 with the carrier of the testing pin in raised position;

Fig. 6 is a front elevation of the carrier in raised position illustrating a modification.

In certain previous applications Nos. 577,182 (Patent 1,701,183, February 5, 1929) and 577,183, I have covered apparatus for indicating the contour of the teeth of spur gears, and for comparing such gears with a standard gear.

The illustrated machine is for making similar tests on gears which are beveled or in which the teeth are spiral or otherwise curved, such, for example, as ordinary spiral bevel gears, hypoid gears and other variants.

The invention will be described on the assumption that the gear is a standard spiral bevel gear and that the contour of the teeth is of a common involute shape, but the machine may be used for gears having teeth of other shapes.

Referring to the embodiment of the invention illustrated, the frame of the machine has a base 1 which carries the gear and a column 2 which carries the principal testing mechanism. On the base is a vertical post 3 supporting a rotatable arbor 4 with an indexing arm 5. The gear 6 is fixed on the arbor by means of a nut 7. The post is carried on a plate 8 arranged to slide backward and forward on the base 1 and actuated by a hand operated screw 9. On the front of the plate 8 is a standard 10 which carries a segment 11 in the form of an arc about the center of the arbor. The arm 5 carries at the other end a spring pawl 12 which engages the spaces between the teeth of the segment 11. The operator pulls out the pawl 12 and swings the indexing arm 5, one tooth at a time, each tooth representing, for example, one degree, and the arm transmits a similar movement rigidly and unyieldingly to the gear to be tested. The adjustment by the screw 9 is in order to bring the teeth of gears of different sizes into engagement with the testing pin 13.

The testing pin is carried through suitable intermediate supports upon a carriage 14 mounted for vertical adjustment on the face of the column 2 by means of a hand screw 15. The carriage 14 carries a mechanism for transforming the indexed gear rotation into a straight line motion comparable to the motion of a rack actuated by the gear.

The pin 13 is shaped like a gear tooth and is fixedly mounted on an arm 15ª journaled at 16 on the corner of a bracket 17 which in turn is pivoted about a stud 18 passing through a plate 19. The latter has lugs 20 at the sides by which it is rotatably mounted on hubs on the lugs 21 which project forward from the lower part of the carriage 14. This is to permit the plate 19 to be swung downward to the proper angle, corresponding to the bevel of the gear, as indicated in Fig. 2.

For a gear of a different angle, the set screw 19ª will be loosened and the plate set at the proper angle and fastened by tightening the set screw.

The arm 15ª lies in a recess in the upper face of the bracket 17 so as to be held between this bracket and the underface of the plate 19. It is fastened in the position of adjustment by means of a screw 22 which passes through a slot in this part of the bracket and is secured by a nut 23 in a curved slot on the underface of the bracket.

The bracket 17 carries a pin 24 which extends through a slot in the plate 19 and is fastened at its upper end to an arm 25 (Fig. 2) which is journaled about the pivot 18. The pin 13 having been set in proper position, its movements under the influence of the tooth of the gear being tested will rock the bracket 17 and communicate the same rocking movement positively and unyieldingly to the arm 25. The pin 24 is fastened to the arm 25 by means of a small screw 25ª which passes through a curved slot 25ᵇ in the arm 25. This permits a certain regulation of the angular relation between the arm 15ª and the arm 25, so as to facilitate the setting of the apparatus in the zero position when the pin 13 makes contact with the gear tooth.

The arm 25 has its free end bifurcated (Figs. 3 and 4) with the contact faces corresponding to those of the teeth of the gear, usually an involute. These contact faces engage a disc 26 whose contact faces preferably have a corresponding contour. The disc is fixed on a rod 27 which has a sliding bearing in the lugs 21 of the vertically adjustable slide 14. At one end, the spring 28 presses the rod 27 always to the left. On the opposite end of the rod, there is a bracket 29 which is fixed on the rod and which has at its upper end a sleeve 30 sliding on an adjusting rod 31 hereinafter referred to. The bracket 29 carries also a gage 32 and a bracket 33 in the left end of whch is pivoted a lever having a short vertical arm and a long horizontal arm bearing on a stem 34 whose movement inward advances the arrow of the gage.

The vertical arm of the operating lever is engaged by a screw 35. This is an ordinary type of gage and may be substituted by various other types.

The screw 35 is carried in a bracket 36 which is set on the rod 31. This rod is arranged to slide in lugs 37 on the face of the vertical slide 14. The rod 31 is prevented from turning by an arm 39 the rear end of which is forked over a rib 39ª on the slide 14. The arm 39 is fastened by a set screw to the shaft and thus prevents the rotation of the latter and holds the screw 35 in line with the bracket 33. The rod and the bracket 36 are pressed to the left by means of a spiral spring 38. The rod bears at its left end against the end 31ª of a rod 31ᵇ which is threaded through a hub 40 of a bracket 40ª mounted on the slide 14 and carrying a vernier scale 41 which overlies the graduated face of the micrometer wheel 42 on the left end of the micrometer shaft 31ᵇ. By turning the wheel 42, therefore, the micrometer shaft is advanced to the right and pushes the rod 31 and the screw 35 to the right so as to advance the gage 32 to a measured extent.

The testing pin 13 is in effect a segment of a crown gear meshing with the bevel gear under test. The angle of the pin is determined by the pressure angle of the gear. The radius of the theoretical crown gear is the distance from the center of rotation 18 to the pin 13. This is a function of the pitch of the gear and is definite for any given gear. Such distances can be increased or diminished by adjustment of the pin 13 about the center 16. The end of the arm 25 acts as a gear tooth engaging the disc 26 corresponding to a rack tooth.

When the pin is set into one of the interdental spaces of the gear and the latter is indexed through one degree, the movement of the pin is transmitted positively and unyieldingly through the parts 25 and 26 to the rod 27 so that the latter should have exactly the movement of a rack engaging the gear tooth under test. This movement is, therefore, transmitted to the gage 32 by the bodily moving of the latter to the right. If the testing micrometer arrangement 41, 42 has been set to show the exact amount of movement which would be transmitted to a rack bar, with a theoretically perfect gear, then the movement of the gage to the right should bring the needle back to zero. If it does not, the departure from zero indicates the extent of the inaccuracy of the contour of the gear tooth.

The machine may be used without the micrometer, first adjusting it so that the screw sets the gage at a convenient point. In that case the operator will observe the backward movements on the gage as he indexes the gear through successive degrees. If these movements are not uniform, the lack of uniformity will indicate the variation of the tooth contour from the theoretically perfect contour; and the point in the height of the tooth can be determined at which the departure from perfection occurs.

The swing of the pin 13 about the point 16 will cause it to describe an arc corresponding to the curvature of the teeth in the case of a spiral bevel gear. The indexing device may be held stationary and the pin 13 turned by means of the handle 15ᵇ. The gage will then indicate any departure of the tooth from its proper lengthwise contour. This may be determined for different points in the height of the tooth by setting the indexing mechanism forward, step by step.

For testing the cross-sectional contour of the tooth at any given point in its length, the slide 8 is moved forward to bring the test tooth 13 to the desired point. The indexing operation, by means of the arm 5, will then gage the cross-section of the tooth at this point. By testing the gear at enough points in the length of the teeth, the contour for the entire length may be checked by setting the slide 8 at a certain point and testing the teeth at intervals around the circumference of the gear.

For testing gears with straight instead of spiral teeth, the bracket 17 and parts mounted thereon may be omitted and the pin 13 mounted directly on an arm 43, Fig. 6, which is pivoted at 18 and is directly connected to the upper arm 25 by the pin 24.

In the testing of large gears, the gear has in some cases been fixed on its arbor and the testing mechanism as a whole rotated about it. Where I refer to the rotating of the gear, therefore, the expression is used relatively, whether the testing mechanism or the gear be given the bodily movement.

Various modification in detail may be made by those skilled in the art without departing from the invention as defined in the following claims.

What I claim is:—

1. A machine for testing the contour of the teeth of a beveled gear comprising in combination a support for the gear adapted to hold it with its axis in fixed position, a pivoted member adapted to engage a tooth of the gear, means for holding said member at an angle corresponding to the bevel of the gear with its pivot at a right angle thereto, a measuring device and means for transmitting to the measuring device the movement of said member about its pivot as the gear is rotated.

2. A machine for testing the contour of the teeth of a gear, which teeth are curved in their length, comprising in combination a support for the gear adapted to hold it with its axis in fixed position, a measuring device and means adapted to actuate the measuring device and to be moved by the gear as the latter is rotated and which has a point of engagement movable in a curved line and adjustable along the curved length of a tooth.

3. A machine for testing the contour of gear teeth comprising in combination a support for the gear adapted to hold it with its axis in fixed position, measuring means including a sliding rod, and an intermediate device having a toothed engagement with said rod and adapted to be engaged and actuated by the gear and to transmit to said measuring means the absolute movement produced by the rotation of the gear.

4. A machine for testing the contour of the teeth of a beveled gear comprising in combination a support for the gear adapted to hold it with its axis in fixed position, measuring means including a sliding rod, and an intermediate pivoted device engaging said rod and adapted to be rocked by the gear and to transmit to said measuring means the absolute movement produced by the rotation of the gear, said intermediate device being angularly adjustable to different positions corresponding to the bevels of different gears.

5. A machine for testing the contour of the teeth of a beveled gear comprising in combination a support for the gear adapted to hold it with its axis in fixed position, measuring means including a sliding rod, and an intermediate pivoted device engaging said rod and adapted to be rocked by the gear and to transmit to said measuring means the absolute movement produced by the rotation of the gear, said intermediate device being mounted to rock on an axis at an angle to that of the gear.

6. A machine for testing the contour of gear teeth comprising in combination a support for the gear adapted to hold it with its axis in fixed position, measuring means including a sliding rod, and an intermediate pivoted device engaging said rod and adapted to be rocked by the gear and to transmit to said measuring means the absolute movement produced by the rotation of the gear, said intermediate device including a segment of a crown gear adapted to be driven by the gear under test.

7. A machine for testing the contour of the teeth of a beveled gear comprising in combination a sliding rod, a rocking arm and a segment of a crown gear adapted to drive said arm and to be driven by the gear under test, said rocking arm having a toothed engagement with said rod adapted to transmit to it the movement of a rack corresponding to a given movement of the gear under test.

8. A machine for testing the contour of the teeth of a gear, which teeth are curved in their length, comprising in combination a sliding rod, a rocking arm, and a segment of a crown gear adapted to drive said arm and to be driven by the gear under test, said rocking arm having a toothed engagement with said rod, adapted to transmit to it the movement of a rack corresponding to a given movement of the gear under test, and means for holding the segment in engagement with a tooth of the gear under test at different points of adjustment along the curved length thereof.

9. A machine for testing the contour of the teeth of a gear, which teeth are curved in their length, comprising in combination a sliding rod, a rocking arm and a segment of a crown gear adapted to drive said arm and to be driven by the gear under test, said rocking arm having a toothed engagement with said rod, adapted to transmit to it the movement of a rack corresponding to a given movement of the gear under test, said segment being adjustable to different points along the curved length of a tooth of the gear under test.

10. A machine for testing the contour of the teeth of a gear, which teeth are curved in their length, comprising in combination a support for the gear under test, a segment of a crown gear adapted to be driven by the gear under test, said segment being movable on said support to engage different points along the curved length of a tooth of the gear under test, a movable holder for said segment, and means for gauging the movement of the holder produced by such movement of the segment.

In witness whereof, I have hereunto signed my name.

GUSTOF L. HANSEN.